Apr. 3, 1923.
J. H. SHARP
1,450,336
AUTOMOBILE PROTECTIVE DEVICE
Filed Nov. 22, 1919
2 sheets-sheet 1
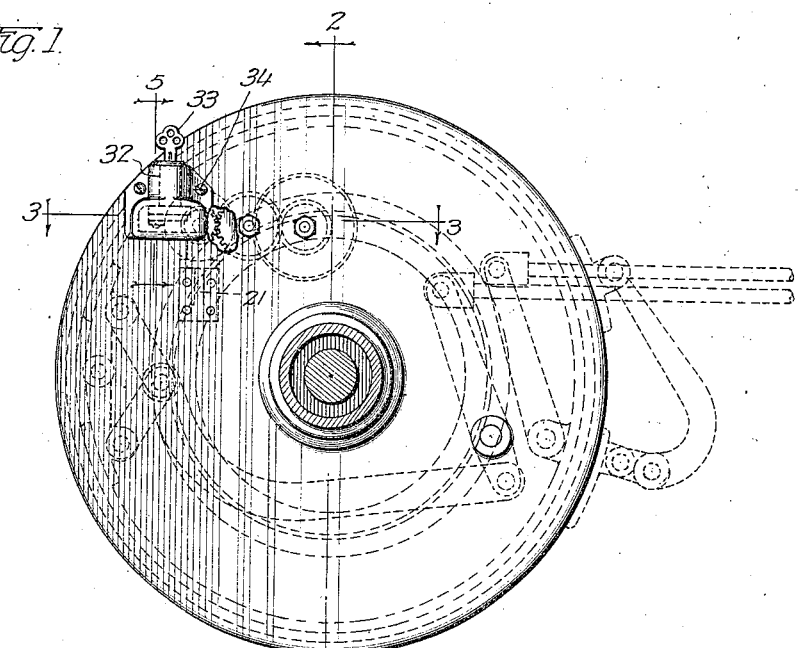
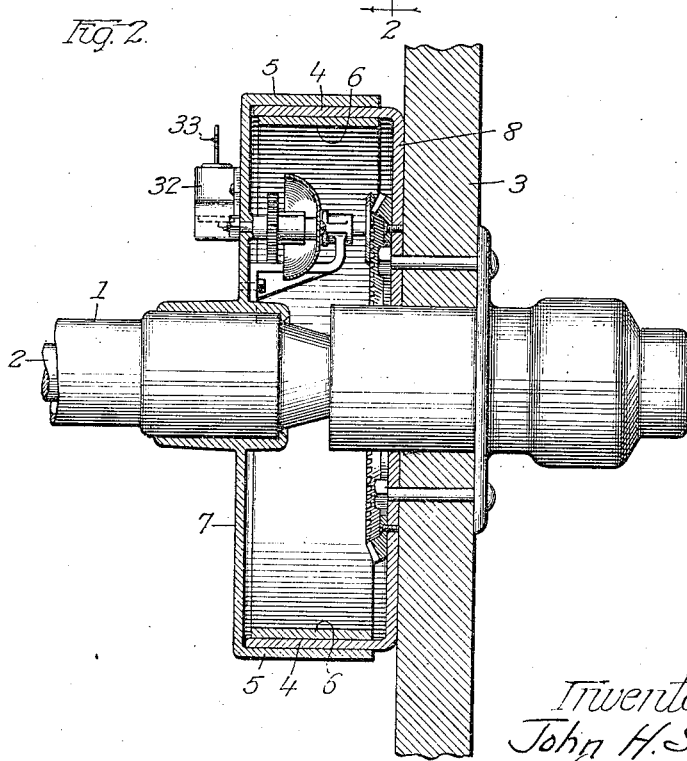
Inventor
John H. Sharp Inventor
John H. Sharp Patented Apr. 3, 1923.

1,450,336

UNITED STATES PATENT OFFICE.

JOHN H. SHARP, OF CHICAGO, ILLINOIS.

AUTOMOBILE PROTECTIVE DEVICE.

Application filed November 22, 1919. Serial No. 339,906.

*To all whom it may concern:*

Be it known that I, JOHN H. SHARP, a citizen of the United States, residing at Chicago, in the county of Cook and State of Illinois, have invented certain new and useful Improvements in an Automobile Protective Device, of which the following is a description.

My invention belongs to that general class of devices known as signal devices and relates particularly to an alarm mechanism or protective device adapted to be installed on automobiles or other vehicles, which may be so set and locked that upon the unauthorized use of the vehicle such use will be called to the attention of the public. The device in its nature is a protective alarm that will render the unauthorized user of the vehicle subject to suspicion and arrest, thereby discouraging the theft or wrongful use of the vehicle. The invention has among its objects the production of a device of the kind described, that is simple, convenient, durable, efficient and satisfactory for use wherever found applicable. Many other objects and advantages of the construction herein shown and described will be obvious to those skilled in the art from the disclosure herein given.

To this end my invention consists of the novel construction, arrangement and combination of parts herein shown and described and more particularly pointed out in the claims.

Figure 3:
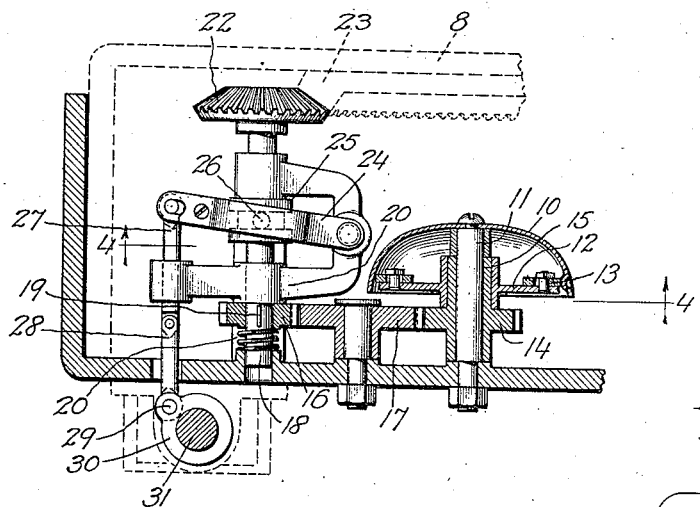
Figure 6:
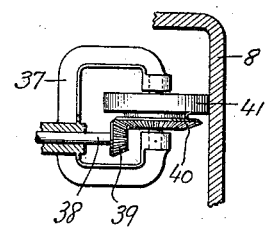
Figure 4:
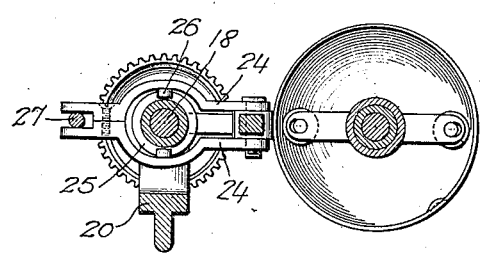
Figure 5:
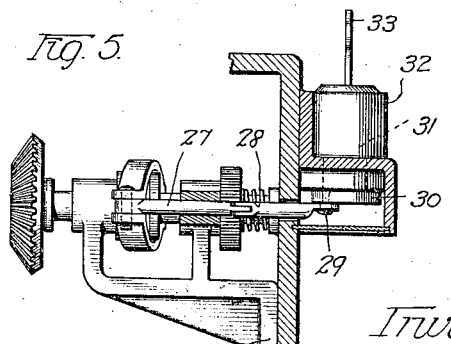

In the drawings, wherein like reference characters indicate like or corresponding parts, Fig. 1 is a view in elevation of a portion of the brake mechanism of an automobile with my device applied thereto, Fig. 2 is a sectional view taken substantially on line 2—2 of Fig. 1, Fig. 3 is an enlarged sectional view taken substantially on line 3—3 of Fig. 1, Fig. 4 is a sectional view taken substantially on line 4—4 of Fig. 3, Fig. 5 is a sectional view taken substantially on line 5—5 of Fig. 1, and Fig. 6 is a view in elevation of a portion of a slightly modified construction.

In order that the device may be clearly understood, it may be mentioned that the same consists of suitable signal or alarm mechanism arranged to be mounted on the vehicle and connected with a part movable when the vehicle is in motion. The same is so arranged that when the vehicle is driven by the owner or other authorized person, or is standing, there will be no alarm or signal given. When the vehicle is standing, however, and the owner not there, the mechanism is locked in operative position so that upon an unauthorized moving of the vehicle, an alarm, either visual or audible, as shown, audible, will be given, so that the attention of passers-by and the public generally will be called to the unauthorized movement of the machine. Traffic and other officers will know that the machine is being driven without authority and the occupants will be observed by others for purposes of identification.

Referring to the drawings, my device is shown applied to one of the rear wheels so that as the wheel turns, the alarm mechanism will be operated unless rendered inoperative by the owner. As most clearly shown in Fig. 2, 1 represents the axle housing, 2 the axle and 3 the wheel. 4 represents a portion of the brake mechanism drum formed on a plate 8 which is secured to the wheel, and 5 and 6 represent the external and internal brake bands arranged to be respectively contracted or expanded to engage the brake drum 4. The bands 5 and 6 are stationary so far as turning with the wheel and are carried by the housing or plate 7, suitably mounted on the axle housing 1. I have not considered it necessary to show or describe the brake mechanism itself in detail and it is immaterial as to whether one or both mechanisms are employed. In some cases only one or the other is applied to the wheels, other brake mechanism being provided at some other desired point. However, the drum 4 and the plate 7 are generally provided on all types of vehicles modified, of course, in details. Arranged within the casing formed by parts 4, 7 and 8 and carried by parts 7, I arrange a bell or similar alarm 10 which may be mounted upon the suitable support 11. Any type of bell having a movable hammer or striker may be employed. In the construction shown, the bell is provided with a rotatable arm or member 12, carrying strikers 13 which will strike the bell on rotation of the arm. Part 12 is driven from the member 8 or its equivalent, through suitable intermediate connecting mechanism. Referring particularly to Figure 3, 14 is a gear operatively connected with the arm 12, the same, as shown, being provided with a sleeve 15 to which the arm is secured. Gear 14 is driven from a gear 16, an intermediate gear 17 being shown. The gear 16 is mounted on shaft 18 which is carried by a bracket 20 or equivalent means for the purpose. As shown, the key 19 secures the gear so that the same rotates with the shaft. Arranged on the end of shaft 18 is a bevel gear or pinion 22 arranged to mesh with the bevel gear 23 carried by and rotatable with part 8 (see Figs. 2 and 3). When the parts are in the positions shown in Fig. 3, movement of the vehicle and rotation of the wheel will drive the gear 23, thereby operating the alarm through the mechanism described. However, the arrangement is such that the mechanism may be rendered inoperative as desired. In the construction illustrated this is accomplished by moving the shaft 18 so that gears 16 and 22 are thrown out of mesh. The shifting or moving mechanism consists of an arm 24 pivotally carried by the bracket 20 and having pins 26 arranged to engage with a collar 25 secured to the shaft 18, 27 and 28 being links extending to the exterior of the brake housing, as shown through plate 7. If desired the spring may be employed to maintain the parts in position, even though the lock mechanism should be destroyed. To control the shifting of the mechanism and lock it against operation I provide a lock of any suitable type, as illustrated, consisting of a barrel 31 arranged in a tubular housing or casing 32. The barrel 31 is connected to link 28 at 29 by means of the collar 30, or the equivalent secured to or connected with the barrel. The housing 32 may be secured in place in any desired manner, for example, by screws 34, rivets or the equivalent. In Figs. 1 and 2 I have illustrated the key 33 for controlling the lock.

The operation of the device may be briefly described as follows: Assuming that the owner desires to leave his car and have the same protected against unauthorized use. He inserts the key and turns barrel 31 substantially to the position shown in Fig. 3, so that gear 22 is in mesh with gear 23 and gear 16 in mesh with gear 17. He then withdraws the key and carries it with him, the device being then locked in operative condition. If the car is moved either by its own power or by being towed or pushed, rotation of the vehicle wheel will drive shaft 18 and through the gears 16, 17 and 14, rotate arms 12, thereby ringing the bell or giving an audible signal. People hearing the vehicle alarm will know that the same is being used without authority and take the necessary steps to apprehend the operator or occupants of the car, or to so scrutinize them as to be able to identify them if required. If the authorized person desires to use the automobile, he inserts his key, and this may be conveniently done between the spokes of the wheel, turning barrel 31 so as to move shaft 18 and disengage and maintain gears 22 and 16 from their cooperating gears. Obviously movement of the car in this case will not actuate the mechanism and no alarm will be given.

In the slightly modified construction shown in Fig. 6, the gear 23 is omitted and a friction drive mechanism provided. Referring to this figure, 37 represents a portion of the bracket 20 and 38 corresponds with shaft 18. In this case a gear 39 is provided on the shaft 38, arranged to mesh with the gear 40 which is suitably connected to a roller 41 which may be of rubber or any other suitable material and which frictionally engages the drum portion 8. In this construction, shifting shaft 38 moves gear 39 out of mesh with gear 40 or into mesh therewith as the case may be. In other respects the devices are similar and operate in substantially the same manner.

While I have shown my mechanism arranged to be driven from one of the wheels and arranged in the brake drum housing, the same may obviously be connected to any other moving part of the vehicle and operate and be controlled in the same way as herein described. The device as constructed is not easily disarranged and it cannot be so injured as to be rendered inoperative. It cannot be muffled nor controlled except by means of the key and while it is convenient for locking or unlocking, it is not readily apparent, nor does it detract from the appearance of the car. While ready for operation, should the car be moved it is silent until the alarm is desirable.

Having thus described my invention, it is obvious that various immaterial modifications may be made in the same without departing from the spirit of my invention, hence I do not wish to be understood as limiting myself to the exact construction, arrangement, combination of parts or uses mentioned.

What I claim as new and desire to secure by Letters Patent is:

1. In a vehicle attachment of the kind described, a bell mechanism arranged on the brake housing carried by the axle housing, actuating means for said bell mechanism comprising a shaft and intermediate gearing connecting said shaft and bell, and means for connecting said shaft with the brake drum, including a rotatable member in driving engagement with the drum, and operatively connected with said shaft, whereby rotation of the drum will rotate said shaft, and key actuated means for moving said rotatable member into or out of engagement with the drum as desired.

2. In a vehicle attachment of the character described, an alarm mechanism disposed on the interior of the brake drum housing carried by the axle, actuating means for said alarm mechanism comprising a driving gear, a gear meshing therewith, and a driven gear cooperating with said last mentioned gear, means carried by the wheel for rotating said driven gear, and means for mounting said driven gear for a sliding movement to place the same into operative and inoperative position, and locking mechanism for locking said driving gear in operative relation with the alarm mechanism.

3. A vehicle attachment of the character described, comprising an alarm mechanism disposed within the interior of the brake drum housing and carried by the axle housing, actuating means therefor comprising driving gears, a driven shaft, means for driving said shaft comprising intermeshing gears, one being carried by the shaft and the other by the brake drum, means for supporting the shaft for a sliding movement to move said last mentioned gears into or out of operative relation, and means for shifting said gears including a shiftable arm, a bracket supporting the arm, and locking mechanism for maintaining said gears in operative relation to cause an actuation of the arm upon a rotation of the vehicle wheels.

4. A vehicle attachment of the character described, comprising an alarm mechanism, means for mounting said alarm mechanism within a brake drum housing, means for operating the alarm comprising a shiftable shaft, a gear carried thereby for driving the alarm, a driven gear on said shaft, means carried by the brake drum and adapted when meshing with said gear to drive the shaft, means for supporting the shaft for a sliding movement to permit the same to be placed into and out of operative relation with the driving gear on the drum, and locking mechanism for maintaining said gear on the shaft and the driving gear on the drum in mesh.

5. A vehicle attachment of the character described, comprising an alarm mechanism, means for mounting said alarm mechanism within a brake drum housing, means for operating the alarm comprising a shiftable shaft, a gear carried thereby for driving the alarm, a driven gear on said shaft, means carried by the brake drum and adapted when meshing with said gear to drive the shaft, means for supporting the shaft for a sliding movement to permit the same to be placed into and out of operative relation with the driving gear on the drum, the adjusting means for said shaft including a shiftable arm connected therewith, a bracket for pivotally supporting one end of the shaft, and a locking mechanism having a connection with the other end of said shaft for the purpose described.

In testimony whereof, I have hereunto signed my name in the presence of two subscribing witnesses.

JOHN H. SHARP.

Witnesses:
 Roy W. Hill,
 Bertha Hartmann.